US011697703B2

(12) United States Patent
Maiorana et al.

(10) Patent No.: US 11,697,703 B2
(45) Date of Patent: Jul. 11, 2023

(54) MANUFACTURE OF NOVOLACS AND RESOLES USING LIGNIN

(71) Applicant: BAKELITE UK HOLDING LTD, Penarth (GB)

(72) Inventors: Anthony Maiorana, Louisville, KY (US); Srirama N. Maddipatla Venkata, San Diego, CA (US); Stephen W. Arbuckle, Louisville, KY (US); Ganapathy Viswanathan, Louisville, KY (US)

(73) Assignee: BAKELITE UK HOLDING LTD.

( * ) Notice: Subject to any disclaimer, the term of this patent is extended or adjusted under 35 U.S.C. 154(b) by 0 days.

(21) Appl. No.: 17/032,731

(22) Filed: Sep. 25, 2020

(65) Prior Publication Data

US 2021/0009745 A1 Jan. 14, 2021

Related U.S. Application Data

(62) Division of application No. 15/881,425, filed on Jan. 26, 2018, now Pat. No. 10,808,068.

(51) Int. Cl.
C08G 8/08 (2006.01)
C08G 8/24 (2006.01)
C08H 7/00 (2011.01)
C08H 8/00 (2010.01)
C08L 61/12 (2006.01)
C08L 97/00 (2006.01)

(52) U.S. Cl.
CPC ............ *C08G 8/24* (2013.01); *C08G 8/08* (2013.01); *C08H 6/00* (2013.01); *C08H 8/00* (2013.01)

(58) Field of Classification Search
None
See application file for complete search history.

(56) References Cited

U.S. PATENT DOCUMENTS

| 2,168,160 | A |   | 8/1939  | Hochwalt |
|---|---|---|---|---|
| 2,282,518 | A | * | 5/1942  | Hochwalt ............... C08G 8/38 527/400 |
| 2,956,033 | A |   | 10/1960 | Alfona et al. |
| 3,227,667 | A |   | 1/1966  | Moffit et al. |
| 3,658,638 | A |   | 4/1972  | Ludwig et al. |
| 3,708,554 | A |   | 1/1973  | Oguri et al. |
| 3,940,352 | A | * | 2/1976  | Wennerblom ........... C08H 6/00 527/303 |
| 4,239,869 | A |   | 12/1980 | Annis |
| 4,303,562 | A |   | 12/1981 | Hollis, Jr. et al. |
| 4,448,951 | A |   | 5/1984  | Rupert et al. |
| 4,740,424 | A |   | 4/1988  | Schumacher et al. |
| 5,010,156 | A |   | 4/1991  | Cook et al. |
| 5,202,403 | A |   | 4/1993  | Dooring |
| 5,260,405 | A |   | 11/1993 | Gardziella et al. |
| 5,412,058 | A |   | 2/1995  | Dreyfus et al. |
| 6,632,912 | B2 |   | 10/2003 | Sudan |
| 6,828,383 | B2 |   | 6/2004  | Durairaj et al. |
| 7,074,861 | B2 |   | 7/2006  | Durairaj et al. |
| 7,498,371 | B2 |   | 3/2009  | Duralraj et al. |
| 7,662,902 | B2 |   | 2/2010  | Hwang et al. |
| 2004/0162391 | A1 |   | 8/2004  | Durairaj et al. |
| 2005/0137379 | A1 |   | 6/2005  | Howard et al. |
| 2008/0090967 | A1 |   | 4/2008  | Dailey |
| 2012/0264864 | A1 |   | 10/2012 | Vergelatl et al. |
| 2014/0080965 | A1 |   | 3/2014  | Yunfeng et al. |
| 2015/0210904 | A1 |   | 7/2015  | Cothran et al. |
| 2016/0090474 | A1 |   | 3/2016  | Sato |
| 2017/0121443 | A1 |   | 5/2017  | Reddy et al. |
| 2019/0106566 | A1 |   | 4/2019  | Reddy et al. |

FOREIGN PATENT DOCUMENTS

| EP | 0400773 B1    | 8/1994  |
|---|---|---|
| GB | 721713 A      | 1/1955  |
| GB | 790644        | 2/1958  |
| JP | 1992363240 A  | 12/1992 |
| KR | 20150135914   | 12/2015 |
| WO | WO2004/018402 | 3/2004  |
| WO | WO2008/048839 | 4/2008  |
| WO | WO2009/155747 | 12/2009 |
| WO | WO2015197295  | 12/2015 |
| WO | WO2016157141 A1 | 10/2016 |

OTHER PUBLICATIONS

Louis Pilato, "Phenolic resins: 100 years and still going strong", Aug. 2012, Reactive & Functional Polymers, 730, p. 270-277 (Year: 2012).*

* cited by examiner

*Primary Examiner* — Melissa A Rioja
(74) *Attorney, Agent, or Firm* — Edmonds & Cmaidalka, P.C.

(57) ABSTRACT

Processes for manufacturing novolacs and resoles from lignin are disclosed. A phenol-aldehyde-lignin dispersion is formed which can then be used to make either a novolac or a resole, depending upon the catalysts used.

20 Claims, No Drawings

US 11,697,703 B2

MANUFACTURE OF NOVOLACS AND RESOLES USING LIGNIN

RELATED APPLICATION DATA

This application is a divisional application of co-pending U.S. application Ser. No. 15/881,425, with a filing date of Jan. 26, 2018, of which the entire content of the co-pending application is incorporated by reference herein.

FIELD OF THE INVENTION

This invention relates to processes for making novolacs and resoles. In particular, this invention relates to processes for making novolacs and resoles using lignin.

BACKGROUND OF THE INVENTION

In the synthesis of phenolic resins, the use of lignin as a phenol substitute would be ideal because it would allow for a sustainable alternative source of phenol and would mitigate the volatility of the global petroleum markets. While numerous references have demonstrated that lignin substitutions into phenolic resins are possible, it is difficult to use lignin as a drop-in phenol replacement due to its inherent macromolecular structure. Lignin substitution of phenol in phenolic resins can produce non-homogenous resins, resins that are too high in viscosity, and resins with curing profiles that are difficult to predict.

It is possible for lignin to be blended into phenolic resins. However, it cannot be blended at high levels. If too much lignin is blended into a phenolic resin, the product can behave as a higher molecular weight polymer that has poor reactivity with traditional phenolic resin crosslinkers. High amounts of lignin can have a detrimental effect on processing, curing kinetics, crosslinking, and other properties of the finished product. One property that can be negatively affected is viscosity, which can result in the resin no longer being useful as a mineral wool binder, wood binder, abrasive binder, or in other high performance applications. Furthermore, different types of lignin vary greatly with regards to carbohydrate content, ash content, and inherent structural diversity depending upon the source (hardwood, softwood, species of tree, type of pulping process, etc.). Different types of lignin can further require slightly different treatments in order to be utilized and can even vary when being produced at the same pulping mill.

Additionally, previous attempts to incorporate lignin into a novolac or a resole involved lengthy acidic or basic depolymerization or methylolation reactions and only allowed for synthesis of one type of phenolic resin (for example, synthesis of a novolac during acidic depolymerization and methylolation). Therefore, a process using lignin for synthesis of resoles and novolacs without inhibiting the properties of the finished product would be desirable.

In addition to allowing for synthesis of resoles and novolacs, a process that can provide flexibility in producing different types of resins that are designed to process for specific applications is desired. For example, the requirements to incorporate lignin into a mineral wool binder will differ significantly from the requirements of a resin designed to work in a friction application. Using lignin as a drop-in replacement of phenol into a phenolic resin designed for the friction industry is not possible due to the inherent macromolecular structure of lignin. Thus, additional processes need to be performed to produce a useful lignin-containing resin. A process that can allow for incorporation of lignin into all types of phenolic resins would be valuable and essential for the growth of non-petroleum based feed-stocks in high performance applications.

SUMMARY OF THE INVENTION

In one broad embodiment of the present invention, there is disclosed a process comprising, consisting of, or consisting essentially of: a) heating a mixture of a first phenol, lignin, and a first catalyst comprising an acidic compound or a basic compound to a temperature in the range of from 100° C. to 200° C. to form a dispersion, b) cooling the dispersion to a temperature in the range of 60° C. to 99° C., c) adding an aldehyde to the dispersion, d) condensing the dispersion to form a phenol-aldehyde-lignin dispersion having from 1 to 10 weight percent of free aldehyde, e) cooling the phenol-aldehyde-lignin dispersion, f) adding a second phenol, g) condensing the phenol-aldehyde-lignin dispersion under reflux conditions in the presence of a second catalyst comprising an acidic compound to form a novolac having from 0.01 to 1 weight percent free aldehyde and h) vacuum distilling the novolac to produce a vacuum distilled novolac having from 0.01 to 10 weight percent free phenol.

In another broad embodiment of the present invention, there is disclosed a process comprising, consisting of, or consisting essentially of: a) heating a mixture of a phenol, lignin, and a first catalyst comprising an acidic compound or a basic compound to a temperature in the range of from 70° C. to 200° C., b) cooling the dispersion to a temperature in the range of from 60° C. to 99° C., c) adding a first aldehyde to the dispersion, d) condensing the dispersion under reflux conditions to form a phenol-aldehyde-lignin dispersion having from 0.01 to 10 weight percent free aldehyde, e) cooling the phenol-aldehyde-lignin dispersion, f) adding a second catalyst comprising a basic compound and a second aldehyde to the phenol-aldehyde-lignin dispersion, and g) condensing the phenol-aldehyde-lignin dispersion to form a resole having from 0.01 to 10 weight percent free aldehyde.

DETAILED DESCRIPTION OF THE INVENTION

The present invention relates to the synthesis of phenolic resins with lignin to produce different lignin-phenolic-aldehyde condensates by adjusting the catalyst and reactants. The finished lignin-phenolic-aldehyde condensates can be novolacs or resoles.

In the present invention, there is disclosed a process comprising: a) heating a mixture of a first phenol, lignin, and a first catalyst comprising an acidic compound or a basic compound to a temperature of from 100° C. to 200° C. to form a dispersion, b) cooling the dispersion to a temperature in the range of 60° C. to 99° C., c) adding an aldehyde to the dispersion, d) condensing the dispersion to form a phenol-aldehyde-lignin dispersion having from 1 to 10 weight percent of free aldehyde, e) cooling the phenol-aldehyde-lignin dispersion, f) adding a second phenol to the phenol-aldehyde-lignin dispersion, g) condensing the phenol-aldehyde-lignin dispersion under reflux conditions in the presence of a second catalyst comprising an acidic compound to form a novolac having from 0.01 to 1 weight percent free aldehyde and h) vacuum distilling the novolac to produce a vacuum distilled novolac having from 0.01 to 10 weight percent free phenol.

Lignin is a biopolymer which binds cellulose and hemicellulose together to help provide structural rigidity to plants and also acts as a protective barrier against fungi. Compositions vary, but generally lignins are cross-linked phenolic biopolymers with a weight average molecular weight range between 1,000-20,000 grams/mole and are notoriously difficult to process once separated from cellulose during the pulping process. Lignin is typically burned to power the boilers of a pulping plant and is otherwise considered to have little to no value in most applications.

Any suitable lignin can be used in the present invention. Examples include, but are not limited to lignosulfonate (obtained via the sulfite pulping process), lignosulfonate salts (such as sodium lignosulfonate), kraft lignins (lignin obtained via the kraft process), pyrolytic lignins (lignin obtained via the pyrolysis process), steam explosion lignin (lignin obtained via the use of steam under high pressure), organosolv lignins (lignin obtained via the organosolv process), soda-ash lignins, dilute acid lignin (lignin obtained via treatment with dilute acids), biorefinery lignins (lignin obtained from any non-pulping process which converts biomass to other chemicals), and combinations thereof.

Generally, the phenols used in this process can be phenol, o-methylphenol, p-methylphenol, m-methylphenol, para-tert-butyl benzene, p-octylphenol, p-phenylphenol, p-cumylphenol, p-isopropylphenol, p-nonylphenol, 2,3-dimethylphenol, 2,4-dimethylphenol, 2,5-dimethylphenol, 2,6-dimethylphenol, 3,4-dimethylphenol, 3,5-dimethylphenol, o-ethylphenol, m-ethylphenol, p-ethylphenol, bisphenol-A, bisphenol-F, resorcinol, catechol, alpha-naphthol, and combinations thereof. Examples of aldehydes that can be used in the present invention include, but are not limited to formaldehyde, paraformaldehyde, trioxane, acetaldehyde, glyoxal, glutaraldehyde, polyoxymethylene, propionaldehyde, isobutyraldehyde, benzaldehyde, acrolein, crotonaldehyde, furfural, 5-hydromethylfural and combinations thereof. Formaldehyde is the most commonly used. Aqueous aldehydes such as formalin can also be used.

In various embodiments, to make a novolac using lignin as a starting component, first a phenolic resin is made then the pH and reactant ratio are adjusted in order to make a novolac. In this process, a first phenol, lignin, and a first catalyst are admixed to form a mixture. These components can be mixed in any order, in any combination or sub-combination.

Lignin is generally present in the mixture in an amount in the range of from 1 weight percent to 60 weight percent. Any and all amounts between 1 weight percent and 60 weight percent are included herein and disclosed herein; for example, lignin can be present in the mixture in the range of from 5 to 50 weight percent, 10 to 45 weight percent, or 15 to 35 weight percent.

The weight ratio of lignin to phenol in the mixture is in the range of from 0.1:1 to 1:1. Any and all ranges between 0.1:1 and 1:1 are included herein and disclosed herein; for example, the mixture can have a weight ratio of lignin to phenol in the range of from 0.3:1, 0.5:1, or 0.75:1.

The first catalyst can be either a basic or acidic compound.

A basic compound is any compound that can be considered an electron donor. Examples of basic compounds that can be useful include, but are not limited to bases such as sodium metal, sodium hydroxide, potassium metal, potassium hydroxide, lithium hydroxide, ammonium hydroxide, magnesium hydroxide, calcium hydroxide, barium hydroxide, sodium carbonate, sodium bicarbonate, potassium carbonate, potassium bicarbonate, potassium phosphate, sodium phosphate, lithium phosphate, ethanol amine, diethanol amine, triethanol amine, triethyl amine, tributyl amine, hexamine, melamine, hexamethylene diamine, guanidine, or benzoguanamine. Dispersions of any two or more basic compounds can also be used.

An acidic compound is any compound which is an electron acceptor. Examples of acidic compounds that can be used include, but are not limited to hydrochloric acid, sulfuric acid, phosphoric acid, nitric acid, oxalic acid, formic acid, acetic acid, trifluoroacetic acid, benzoic acid, methane sulfonic acid, and p-toluenesulfonic acid. Dispersions of any two or more acidic compounds can also be used.

After the phenol/lignin/first catalyst mixture is formed, the mixture is heated to a temperature in the range of from 100° C. to 200° C. for a period of time in the range of 0.1 to 24 hours to form a dispersion. Any and all temperature ranges between 100° C. and 200° C. and time periods between 0.1 to 24 hours are included herein and disclosed herein, for example, the mixture can be heated to a temperature in the range of from 110° C. to 185° C., 115° C. to 180° C., or from 135° C. to 175° C. for a time period in the range of from 0.5 hours to 12 hours or from 0.8 hours to 5 hours.

After heating, the dispersion is cooled to a temperature in the range of from 60° C. to 99° C. and an aldehyde is fed to the dispersion. The aldehyde is generally fed to the dispersion over a period of time in the range of from 45 minutes to two hours.

The aldehyde is added to the dispersion in an amount in the range of from 0.9 to 4.5 moles of aldehyde per mole of phenol. Any and all ranges between 0.9 to 4.5 moles of aldehyde per mole of phenol are included herein and disclosed herein; for example, the components can be present in amounts in the range of from 1 to 4, 1 to 3, 1.5 to 2.5, 1.5 to 2.3, or 1.7 to 2 moles of aldehyde per mole of phenol.

Once the aldehyde has been fed to the dispersion, the dispersion is then condensed to form a condensed phenol-aldehyde-lignin copolymer dispersion (hereinafter referred to as a "phenol-aldehyde-lignin dispersion") having from 1 to 10 weight percent of unreacted aldehydes (hereinafter referred to as 'free aldehyde').

After the condensing process is complete, the condensed phenol-aldehyde-lignin dispersion is cooled to a temperature in the range of from 40° C. to 70° C. after which a second phenol and an acidic compound are added to the phenol-aldehyde-lignin dispersion.

The second phenol can be selected from the list of phenols described above. The second phenol can be the same or different from the first phenol. At this stage, the phenol and aldehyde components are present in an amount in the range of from 0.1 to 0.9 moles of aldehyde per mole of phenol. Any and all ranges between 0.1 to 0.9 moles of aldehyde per mole of phenol are included herein and disclosed herein; for example, the components can be present in amounts in the range of from 0.1 to 0.85, 0.1 to 0.60, 0.2 to 0.7, or 0.2 to 0.5 moles of aldehyde per mole of phenol. The acidic catalyst is selected from those described above.

If desired, the phenol-aldehyde-lignin dispersion can be neutralized to a pH ranging from 6.5 to 7.5. After the dispersion is neutralized, acidic catalyst can be added before the dispersion is condensed under reflux conditions as described below.

After the condensed phenol-aldehyde-lignin dispersion has been neutralized and the acidic catalyst and second phenol have been added, the phenol-aldehyde-lignin dispersion is then condensed under reflux conditions. This involves returning any volatile compounds such as water, aldehyde, or phenol to the dispersion. This process forms a novolac composition having from 0.01 weight percent to 1 weight percent free aldehyde.

The novolac is then vacuum distilled to produce a vacuum distilled novolac having from 0.01 to 10 weight percent free phenol.

If desired, a crosslinker can then be added to the vacuum distilled novolac. Examples of crosslinkers include, but are not limited to hexamine, epoxy resins, resoles, polyisocyanates, paraformaldehyde, polybenzoxazines, cyanate esters, other aldehyde donors, and combinations thereof.

The end product possesses common amorphous thermoplastic characteristics such as being able to flow at elevated temperatures, a glass transition temperature in the range of 0 to 165° C., a softening point in the range of −10 to 180° C., having reactivity with aldehyde containing compounds such as hexamine, paraformaldehyde, and resoles, and having reactivity with epoxy or isocyanate containing compounds such as the diglycidyl either of bisphenol A or polyisocyanates such as toluene diisocyanate.

In another aspect of the invention, there is disclosed a process to make a resole comprising: a) heating a mixture of a phenol, lignin, and a first catalyst comprising an acidic compound or a basic compound to a temperature in the range of from 70° C. to 200° C. to form a dispersion, b) cooling the dispersion to a temperature in the range of from 60° C. to 99° C., c) adding a first aldehyde to the dispersion, d) condensing the dispersion under reflux conditions to form a phenol-aldehyde-lignin dispersion having from 0.01 to 10 weight percent free aldehyde, e) cooling the phenol-aldehyde-lignin dispersion, f) adding a second catalyst comprising a basic compound and a second aldehyde to the phenol-aldehyde-lignin dispersion, and g) condensing the phenol-aldehyde-lignin dispersion to form a resole having from 0.01 to 10 weight percent free aldehyde.

In various embodiments, to make a resole using lignin as a starting component, first a novolac is made, and then the catalyst is switched in order to make a resole. Or in various other embodiments, a resole can be made in the first stage and the catalyst is not switched. In this process, a phenol, lignin, and a first catalyst are admixed to form a mixture. Examples of all of these components are described above. The first catalyst can be any acidic or basic compound described above. These components can be mixed in any order, in any combination or sub-combination.

Lignin is generally present in the mixture in an amount in the range of from 1 weight percent to 60 weight percent. Any and all amounts between 1 weight percent and 60 weight percent are included herein and disclosed herein; for example, lignin can be present in the mixture in the range of from 5 to 50 weight percent, 10 to 45 weight percent, or 15 to 35 weight percent.

The mixture is heated to a temperature in the range of from 70° C. to 200° C. to form a dispersion. Any and all temperatures between 70° C. and 200° C. are included herein and disclosed herein; for example, the mixture can be heated to a temperature in the range of from 90° C. to 185° C., 115° C. to 180° C., or from 135° C. to 175° C. for a time period in the range of from 0.5 hours to 12 hours or from 0.8 hours to 5 hours.

After the dispersion is formed, it is cooled to a temperature between 60° C. and 99° C. and a first aldehyde is added. The first aldehyde can be selected from any of the aldehydes described above. At this stage, the phenol/lignin and first aldehyde are present in the dispersion in an amount in the range of from 0.1 to 0.85 moles of aldehyde per mole of phenol. Any and all ranges between 0.1 to 0.85 moles of aldehyde per mole of phenol are included herein and disclosed herein; for example, the components can be present in amounts in the range of from 0.2 to 0.7, from 0.2 to 0.6 or from 0.2 to 0.5 moles of aldehyde per mole of phenol. The first aldehyde is fed to the dispersion over a time period of from 45 minutes to 2 hours.

The dispersion is then condensed under reflux conditions until the dispersion contains from 0.01 percent to 10 weight percent free aldehyde to form a phenol-aldehyde-lignin dispersion. In various other embodiments, the phenol-aldehyde-lignin dispersion can contain from 0.5 percent to 7 percent free aldehyde. Then the phenol-aldehyde-lignin dispersion is pH adjusted to a range of from 8 to 14 with a second catalyst comprising a basic compound. Any basic compound from the list above can be used. Additional aldehyde is then added to have a molar ratio of 0.9 to 4.5 moles of aldehyde to phenol and the phenol-aldehyde-lignin condensate dispersion is further condensed or optionally distilled to yield a resole.

The phenol-aldehyde-lignin condensates can be used in various industrial applications which use phenolic resin binders. Such applications include, but are not limited to friction applications, non-continuous fiber bonding, abrasives, refractory, adhesives, wood binders, coal briquetting, laminates, oilfield proppants and demulsifiers, foams, and protective coating materials.

EXAMPLES

In order that those skilled in the art may more fully understand the invention presented herein, the following procedures and examples are set forth.

Examples 1-5: Novolacs

Example 1 Comparative 40 parts by weight of phenol and 1.65 parts 50% sodium hydroxide were charged to a 4 neck round bottom flask equipped with mechanical agitation, thermocouple, temperature controlled heating mantle, and dean stark reflux condenser. The dispersion was heated to 75° C. and 43.4 parts of 50% formaldehyde was fed to the dispersion over 50 minutes. The dispersion was condensed at 75° C. until free formaldehyde content was about 5% of the dispersion and then the dispersion was cooled to 60° C. 60 parts of phenol were then charged to the flask and the temperature was maintained at 60° C. The contents were then neutralized with hydrochloric acid until the pH was around 7. 1.4 parts of oxalic acid was then charged to the flask and condensation occurred at 100-105° C. until the free formaldehyde was less than 0.7% of the condensate. The flask was equipped with atmospheric distillation and the temperature was raised to 160° C. The flask was then equipped with vacuum distillation and was distilled to 175° C. and 27.5 inches of mercury. Excess phenol was removed via steam sparge assisted vacuum distillation and the product was then ejected from the flask.

Example 2

40 parts phenol, 1.7 parts 50% sodium hydroxide, and 15 parts kraft lignin were charged to a 4 neck round bottom flask equipped with mechanical agitation, thermocouple, temperature controlled heating mantle, and dean stark reflux condenser. The dispersion was heated to 170° C. and was held at that temperature for 1 hour while constantly returning the condensed phenol to the flask. The temperature was reduced to 75° C. and 37.1 parts of 50% formaldehyde was fed to the flask over 50 minutes. The dispersion was condensed at 75° C. until the free formaldehyde content was less than 3% of the dispersion and was then cooled to 60° C. 60 parts of phenol was then charged to the flask and the temperature was maintained at 60° C. The dispersion was neutralized with hydrochloric acid until the pH was about 7. Then 0.7 parts of oxalic acid was charged to the flask and the dispersion was condensed at 100-105° C. until the free formaldehyde content was less than 0.7% of the condensate. The flask was equipped with atmospheric distillation and the temperature was raised to 160° C. The flask was then equipped with vacuum distillation and was distilled to 175° C. and 27.5 inches of mercury. Excess phenol was removed via steam sparge assisted vacuum distillation and the product was then ejected from the flask.

Example 3

40 parts phenol, 1.7 parts 50% of sodium hydroxide, and 22 parts kraft lignin were charged to a 4 neck round bottom flask equipped with mechanical agitation, thermocouple, temperature controlled heating mantle, and dean stark reflux condenser. The dispersion was heated to 170° C. and was held at that temperature for 1 hour while constantly returning condensed phenol to the flask. The temperature was reduced to 75° C. and 37.1 parts of 50% formaldehyde was fed to the flask over 50 minutes. The dispersion was condensed at 75° C. until the free formaldehyde content was less than 3% and was then cooled to 60° C. 60 parts of phenol was then charged to the flask and the temperature was maintained at 60° C. The dispersion was neutralized with hydrochloric acid until the pH was about 7. 0.7 parts of oxalic acid were then charged to the flask and the dispersion was condensed at 100-105° C. until the free formaldehyde content was less than 0.7% of the condensate. The flask was equipped with atmospheric distillation and the temperature was raised to 160° C. The flask was then equipped with vacuum distillation and was distilled to 175° C. and 27.5 inches of mercury. Excess phenol was removed via steam sparge and the product was then ejected from the flask.

Example 4

40 parts phenol, 2 parts 50% sodium hydroxide, and 27 parts kraft lignin were charged to a 4 neck round bottom flask equipped with mechanical agitation, thermocouple, temperature controlled heating mantle, and dean stark reflux condenser. The dispersion was heated to 170° C. and was held at that temperature for 1 hour while constantly returning condensed phenol to the flask. The temperature was reduced to 75° C. and 37.1 parts of 50% formaldehyde was fed to the flask over 50 minutes. The dispersion was condensed at 75° C. until the free formaldehyde content was about 5% and was then cooled to 60° C. 60 parts of phenol was then charged to the flask and the temperature was maintained at 60° C. The dispersion was neutralized with hydrochloric acid until the pH was about 7. 0.7 parts of oxalic acid were then charged to the flask and the dispersion was condensed at 100-105° C. until the free formaldehyde content was less than 0.7% of the condensate. The flask was equipped with atmospheric distillation and the temperature was raised to 160° C. The flask was then equipped with vacuum distillation and was distilled to 175° C. and 27.5 inches of mercury. Excess free phenol was removed via steam sparge and the product was then ejected from the flask.

Example 5

40 parts phenol, 2.7 parts 50% sodium hydroxide, and 15 parts kraft lignin were charged to a 4 neck round bottom flask equipped with mechanical agitation, thermocouple, temperature controlled heating mantle, and dean stark reflux condenser. The dispersion was heated to 170° C. and was held at that temperature for 1 hour while constantly returning condensed phenol to the flask. The temperature was reduced to 75° C. and 33.4 parts of 50% formaldehyde was fed to the flask over 50 minutes. The dispersion was condensed at 75° C. until the free formaldehyde content was less than 1.5% and was then cooled to 60° C. 60 parts of phenol was then charged to the flask and the temperature was maintained at 60° C. The dispersion was neutralized with hydrochloric acid until the pH was about 7. 1.9 parts of oxalic acid were then charged to the flask and the dispersion was condensed at 100-105° C. until the free formaldehyde content was less than 0.7% of the condensate. The flask was equipped with atmospheric distillation and the temperature was raised to 160° C. The flask was then equipped with vacuum distillation and was distilled to 175° C. and 27.5 inches of mercury. Excess phenol was removed via steam sparge and the product was then ejected from the flask.

The data in Table 1 was derived in accordance with the following procedures.

Viscosity Measurement: Examples 1-5 utilized a cone and plate melt viscometer apparatus supplied by a Brookfield viscometer where the heated stage was the "plate" and a number 6 cone was used for the "cone." The polymeric materials generated from Examples 1-5 were melted on the plate and the viscosity was measured when the cone was placed into contact with the polymeric sample and contact with the plate was made. The cone rotated at 1000 revolutions per minute until the instrument was able to measure the viscosity at a steady state. The viscosity was then recorded and is reported in Table 1.

Char Yield: About 10 milligrams of sample was placed into an alumina crucible and placed in a thermogravimetric analyzer (Q50 TA Instruments) and ramped from ambient temperature to 1000° C. under nitrogen purge. The char yield from nitrogen purge is reported as the remaining weight in the crucible at 1000° C. After reaching 1000° C. the samples were ramped to 550° C. and the gas was switched from nitrogen to air and held at this temperature for 30 minutes. The char yield at the end of the 30 minutes at 550° C. is reported as char yield for air.

Glass Plate Flow: 0.5 grams of novolac powder containing 9% hexamine was pressed into a 12 mm diameter pill with a height of 10 mm and placed on a clean glass slide. The slide containing the pressed pill was placed into a 150° C. oven equipped with a stage that is capable of being parallel with the floor position and a 45° angle position. The pill on the slide is allowed to equilibrate on the plate at the parallel position for 3 minutes and then for 15 minutes at the 45° angle position. The length that the polymer flowed during the duration of the test is measured in millimeters starting from the back edge of the pill to the front of the polymer. If the sample exhibited "no flow" the minimum reportable number would be 12 mm.

TABLE 1

Properties of Novolacs (Examples 1 to 5):

| Novolac | % Free Phenol by Gas Chromatography | Cone &Plate Viscosity 150° C. (cP)[2] | Char Yield (wt %)[1] | | Glass Plate Flow (mm)[3] |
| --- | --- | --- | --- | --- | --- |
| | | | $N_2$ | Air | |
| Example 1 (Comparative) | 0.70% | 2500 | 55 | 3 | 60 |

TABLE 1-continued

Properties of Novolacs (Examples 1 to 5):

| Novolac | % Free Phenol by Gas Chromatography | Cone &Plate Viscosity 150° C. (cP)[2] | Char Yield (wt %)[1] | | Glass Plate Flow (mm)[3] |
|---|---|---|---|---|---|
| | | | $N_2$ | Air | |
| Example 2 | 0.45% | 2080 | 54 | 5 | 61 |
| Example 3 | 0.6% | 2230 | 56 | 4 | 47 |
| Example 4 | 0.48% | 3100 | 53 | 2 | 56 |
| Example 5 | 0.50% | 11640 | 53 | 10 | 25 |

[1]Char Yield: 1000° C. in $N_2$ and then 550° C. in air
[2]Cone-6 was used to measure C&P viscosity
[3]9% Hexamine ground with the novolacs described above were made for the studies

Examples 6-8: Resoles

Example 6 Comparative 85 parts of phenol, 0.6 parts of p-toluene sulfonic acid (PTSA), and 15 parts of sodium lignosulfonate were charged to a 4 neck round bottom flask equipped with mechanical agitation, thermocouple, temperature controlled heating mantle, and dean stark reflux condenser. The dispersion was heated to 100° C. and 18.2 parts of 50% formaldehyde were fed to the flask over 30 minutes. The dispersion was refluxed at 100-105° C. until the free formaldehyde content of the condensate was less than 2% and the temperature was then decreased to 70° C. The dispersion was neutralized with 50% NaOH and the pH was gradually brought to around 9 to 9.5. 64 parts of 50% formaldehyde were then charged to the flask over a period of 50 minutes and the temperature was maintained at 85° C. The reaction dispersion was condensed further at 85° C. until the free formaldehyde content of the dispersion was between 1-3%. The target amount of water (15 parts) was distilled at 60° C. and 27.5 inches of mercury vacuum and the product was stored in a refrigerator at 4° C.

Example 7

85 parts of phenol, 0.7 parts of PTSA, and 15 parts of sodium lignosulfonate were charged to a 4 neck round bottom flask equipped with mechanical agitation, thermocouple, temperature controlled heating mantle, and dean stark reflux condenser. The dispersion was heated to 100° C. and 18.2 parts of 50% formaldehyde were fed to the flask over 30 minutes. The dispersion was refluxed at 100-105° C. until the free formaldehyde content of the condensate was less than 2% and the temperature was then decreased to 70° C. The dispersion was neutralized with 50% NaOH and the pH was gradually brought to around 9 to 9.5. Then 64 parts of 50% formaldehyde were charged to the flask over a period of 50 minutes and the temperature was maintained at 85°. The reaction dispersion was condensed further at 85° C. until the free formaldehyde content of the condensate was less than 1%. The target amount of water (25 parts) was distilled at 60° C. under 27.5 inches of mercury vacuum and the product was stored in a refrigerator at 4° C.

Example 8

85 parts of phenol, 0.8 parts of PTSA, and 15 parts of sodium lignosulfonate were charged to a 4 neck round bottom flask equipped with mechanical agitation, thermocouple, temperature controlled heating mantle, and dean stark reflux condenser. The dispersion was heated to 100° C. and 18.2 parts of 50% formaldehyde were fed to the flask over 30 minutes. The dispersion was refluxed at 100-105° C. until the free formaldehyde content of the condensate was less than 2% and the temperature was then decreased to 70° C. The dispersion was neutralized with 50% NaOH and the pH was gradually brought to around 9 to 9.5. Then 64 parts of 50% formaldehyde were charged to the flask over a period of 50 minutes and the temperature was maintained at 85° C. The reaction dispersion was condensed further at 85° C. until the free formaldehyde content was less than 0.7% of the condensate. The target amount of water (40 parts) was distilled at 60° C. and 27.5 inches of mercury vacuum. The reaction dispersion was cooled to below 40° C. and 40 parts of methanol were charged to the flask while mixing constantly. The product was stored in a refrigerator at 4° C.

The data in Table 2 was derived in accordance with the following procedures.

Oven Solids: 1.5 grams of sample are weighed in a pre-weighed aluminum weigh boat and then placed in an oven at 135° C. for three hours and then reweighed. The two weights are subtracted and divided by the original weight and multiplied by 100 to achieve the % oven solids number.

Water Tolerance: 10 grams of sample is added to a test-tube and a gram of water is added and the test-tube is shaken until the sample is clear. The test-tube is kept at 25° C. throughout the duration of the test with intermittent immersion in a water bath. Water is added to the sample until a cloud point is achieved i.e. a cloudy solution. The amount of water added is divided by the initial sample weight and multiplied by 100 to achieve % water tolerance.

Water Content: determined by Karl Fischer titration.

TABLE 2

The Properties of Resoles (Examples 6 to 8)

| Novasol | % Free Phenol | % Free HCHO | Viscosity at 25° C. (cP) | % Water by Karl Fischer Titration | % Oven Solids | % Water Tolerance | pH |
|---|---|---|---|---|---|---|---|
| Example 6 (Comparative) | 4.2 | 2.2 | 2950 | 23 | 70 | NA (0) | 8.55 |
| Example 7 | 5.5 | 0.8 | 12000 | 18 | 75 | NA (0) | 8.54 |
| Example 8 | 3.5 | 0.69 | 275 | 9.5 | 63 | 97 | 8.88 |

While the present invention has been described and illustrated by reference to particular embodiments and examples, those of ordinary skill in the art will appreciate that the invention lends itself to variations not necessarily illustrated herein.

The invention claimed is:

1. A process comprising:
   a) heating a mixture of a phenol, lignin, and a first catalyst comprising an acidic compound to a temperature in the range of from 70° C. to 200° C. to form a dispersion;
   b) cooling the dispersion to a temperature in the range of from 60° C. to 99° C.;
   c) adding a first aldehyde to the dispersion;
   d) condensing the dispersion under reflux conditions to form a phenol-aldehyde-lignin dispersion having from 0.01 to 10 weight percent free aldehyde;
   e) cooling the phenol-aldehyde-lignin dispersion;
   f) adding a second aldehyde and a second catalyst comprising a basic compound to the phenol-aldehyde-lignin dispersion; and then
   g) condensing the phenol-aldehyde-lignin dispersion to form a resole having less than 1 weight percent free aldehyde.

2. The process of claim 1, wherein after the first aldehyde has been added to the dispersion in step c), the phenol- and first aldehyde are present in the dispersion in an amount in the range of from 0.1 to 0.85 moles of the first aldehyde per mole of phenol.

3. The process of claim 1, wherein after the second aldehyde has been added to the dispersion in step f), the phenol and total aldehyde components are present in the phenol-aldehyde-lignin dispersion in an amount in the range of from 0.9 to 4.5 moles of second aldehyde per mole of phenol.

4. The process of claim 1, wherein the lignin is selected from the group consisting of lignosulfonates, lignosulfonate salts, kraft lignins, pyrolytic lignins, steam explosion lignins, organosolv lignins, soda-ash lignins, dilute acid lignins, biorefinery lignins, and combinations thereof.

5. The process of claim 1, wherein the lignin is present in the mixture of step a) in an amount in the range of from 1 weight percent to 60 weight percent.

6. The process of claim 1, wherein the phenol is selected from the group consisting of phenol, o-methylphenol, p-methylphenol, m-methylphenol, para-tert-butyl phenol, p-octylphenol, p-phenylphenol, p-cumylphenol, p-isopropylphenol, p-nonylphenol, 2,3-dimethylphenol, 2,4-dimethylphenol, 2,5-dimethylphenol, 2,6-dimethylphenol, 3,4-dimethylphenol, 3,5-dimethylphenol, o-ethylphenol, m-ethylphenol, p-ethylphenol, bisphenol-A, resorcinol, catechol, alpha-naphthol, beta-naphtol, cardanol, and combinations thereof.

7. The process of claim 1, wherein the first and second aldehyde are the same or different and are selected from the group consisting of formaldehyde, paraformaldehyde, trioxane, acetaldehyde, glyoxal, gluteraldeyhde, polyoxymethylene, propionaldehyde, isobutyraldehyde, benzaldehyde, acrolein, crotonaldehyde, furfural, 5-hydromethylfural, and combinations thereof.

8. The process of claim 1, wherein the first catalyst is selected from the group consisting of hydrochloric acid, sulfuric acid, phosphoric acid, nitric acid, oxalic acid, formic acid, acetic acid, trifluoroacetic acid, benzoic acid, methane sulfonic acid, and p-toluenesulfonic acid; and wherein the second catalyst is selected from sodium metal, sodium hydroxide, potassium metal, potassium hydroxide, lithium hydroxide, ammonium hydroxide, magnesium hydroxide, calcium hydroxide, barium hydroxide, sodium carbonate, sodium bicarbonate, potassium carbonate, potassium bicarbonate, potassium phosphate, sodium phosphate, lithium phosphate, ethanol amine, diethanol amine, triethanol amine, triethyl amine, tributyl amine, hexamine, melamine, hexamethylene diamine, guanidine, and benzoguanamine.

9. The process of claim 1, wherein the first catalyst is selected from the group consisting of hydrochloric acid, sulfuric acid, phosphoric acid, nitric acid, oxalic acid, formic acid, acetic acid, trifluoroacetic acid, benzoic acid, methane sulfonic acid, and p-toluenesulfonic acid.

10. The process of claim 1, wherein the second catalyst is selected from the group consisting of sodium metal, sodium hydroxide, potassium metal, potassium hydroxide, lithium hydroxide, ammonium hydroxide, magnesium hydroxide, calcium hydroxide, barium hydroxide, sodium carbonate, sodium bicarbonate, potassium carbonate, potassium bicarbonate, potassium phosphate, sodium phosphate, lithium phosphate, ethanol amine, diethanol amine, triethanol amine, triethyl amine, tributyl amine, hexamine, melamine, hexamethylene diamine, guanidine, and benzoguanamine.

11. The process of claim 1, wherein the resole has a glass transition temperature of 0° C. to 165° C. and a softening point of −10° C. to 180° C.

12. A process for making a resole resin, comprising:
   a) heating a mixture of a phenol, lignin, and a first catalyst comprising an acidic compound to a temperature in the range of from 70° C. to 200° C. to form a dispersion;
   b) cooling the dispersion;
   c) adding a first aldehyde to the dispersion;
   d) condensing the dispersion under reflux conditions to form a phenol-aldehyde-lignin dispersion having from 0.01 to 10 weight percent free aldehyde;
   e) cooling the phenol-aldehyde-lignin dispersion;
   f) adding a second aldehyde and a second catalyst comprising a basic compound to the phenol-aldehyde-lignin dispersion;
   g) condensing the phenol-aldehyde-lignin dispersion to form a resole having from 0.01 to 10 weight percent free aldehyde; and then
   h) distilling the resole to produce a distilled resole having from 0.01 to 10 weight percent free aldehyde.

13. The process of claim 12, further comprising adding a crosslinker to the distilled resole.

14. The process of claim 13, wherein the crosslinker is selected from the group consisting of hexamine, epoxy resins, resoles, polyisocyanates, paraformaldehyde, polybenzoxazines, cyanate esters, other aldehyde donors, and combinations thereof.

15. The process of claim 12, wherein the resole has a glass transition temperature of 0° C. to 165° C. and a softening point of −10° C. to 180° C.

16. A process for making a resole resin, comprising:
   a) heating a mixture of a phenol, lignin, and a first catalyst comprising an acidic compound to a temperature in the range of from 70° C. to 200° C. to form a dispersion having a weight ratio of lignin to phenol ranging from 0.1:1 to 1:1;
   b) cooling the dispersion;
   c) adding a first aldehyde to the dispersion;
   d) condensing the dispersion under reflux conditions to form a phenol-aldehyde-lignin dispersion having from 0.01 to 10 weight percent free aldehyde;
   e) cooling the phenol-aldehyde-lignin dispersion;
   f) adding a second aldehyde and a second catalyst comprising a basic compound to the phenol-aldehyde-lignin dispersion;

g) condensing the phenol-aldehyde-lignin dispersion to form a resole having less than 1 weight percent free aldehyde; and then h) distilling the resole to produce a distilled resole having from 0.01 to 10 weight percent free aldehyde, a glass transition temperature of 0° C. to 165° C. and a softening point of −10° C. to 180° C.

17. The process of claim 16, further comprising adding a crosslinker to the distilled resole.

18. The process of claim 17, wherein the crosslinker is selected from the group consisting of hexamine, epoxy resins, resoles, polyisocyanates, paraformaldehyde, polybenzoxazines, cyanate esters, other aldehyde donors, and combinations thereof.

19. The process of claim 16, wherein the weight ratio of the lignin to phenol in the dispersion of step a) is 0.3:1.

20. The process of claim 16, wherein the weight ratio of the lignin to phenol in the dispersion of step a) is 0.5:1.

* * * * *